(12) United States Patent
Milster et al.

(10) Patent No.: US 12,513,412 B2
(45) Date of Patent: *Dec. 30, 2025

(54) SYSTEM AND METHOD FOR TELESCOPIC IMAGING OF DIM OBJECTS NEAR BRIGHT OBJECTS

(71) Applicant: Government of the United States as represented by the Secretary of the Air Force, Kirtland AFB, NM (US)

(72) Inventors: Scott P. Milster, Tijeras, NM (US); Waid T. Schlaegel, Albuquerque, NM (US)

(73) Assignee: United States of America as represented by the Secretary of the Air Force, Kirtland AFB, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/130,875

(22) Filed: Apr. 4, 2023

(65) Prior Publication Data

US 2023/0345131 A1 Oct. 26, 2023

Related U.S. Application Data

(63) Continuation-in-part of application No. 16/782,896, filed on Feb. 5, 2020, now Pat. No. 11,618,594.

(60) Provisional application No. 63/456,740, filed on Apr. 3, 2023, provisional application No. 62/802,588, filed on Feb. 7, 2019.

(51) Int. Cl.
*H04N 23/75* (2023.01)
*H04N 7/18* (2006.01)
*H04N 23/695* (2023.01)

(52) U.S. Cl.
CPC .............. *H04N 23/75* (2023.01); *H04N 7/18* (2013.01); *H04N 23/695* (2023.01)

(58) Field of Classification Search
CPC ......... H04N 23/75; H04N 23/695; H04N 7/18
USPC ...................................................... 348/143
See application file for complete search history.

(56) References Cited

U.S. PATENT DOCUMENTS

| | | | | |
|---|---|---|---|---|
| 4,221,966 A | * | 9/1980 | Kerr | G02B 23/12 250/342 |
| 4,910,401 A | * | 3/1990 | Woods | H04N 3/09 348/E3.01 |
| 6,278,100 B1 | * | 8/2001 | Friedman | G02B 27/644 359/399 |
| 8,189,189 B1 | * | 5/2012 | Herendeen | G01J 3/513 356/300 |
| 8,218,013 B1 | * | 7/2012 | Ellis | G01C 21/025 348/169 |
| 9,423,341 B1 | * | 8/2016 | Jim | G01N 21/359 |
| 10,338,371 B1 | * | 7/2019 | Morrison | G02B 17/006 |
| 2010/0013645 A1 | * | 1/2010 | Meier | G01W 1/00 340/601 |

(Continued)

*Primary Examiner* — Matthew David Kim
(74) *Attorney, Agent, or Firm* — AFNWC/JA; David L. Narciso

(57) ABSTRACT

Various embodiments are directed to telescopic apparatus, systems and methods for imaging dim objects near bright objects, include daylight imaging of satellites and other objects, a platform/telescope configured for daylight imaging of satellites and other objects, as well as modifications thereto configured to perform specific functions individually and/or in conjunction with other platforms/devices (e.g., radar tracking devices).

19 Claims, 12 Drawing Sheets

(56) References Cited

U.S. PATENT DOCUMENTS

| | | | |
|---|---|---|---|
| 2013/0201342 A1* | 8/2013 | Skaff | H04N 9/43 |
| | | | 348/E5.09 |
| 2013/0268096 A1* | 10/2013 | Riddle | G03B 21/2033 |
| | | | 700/275 |
| 2016/0189921 A1* | 6/2016 | Sotirelis | G01T 1/2907 |
| | | | 250/394 |
| 2020/0110255 A1* | 4/2020 | Bauman | G02B 17/0808 |
| 2020/0241279 A1* | 7/2020 | Britton | G01S 3/786 |

* cited by examiner

SYSTEM AND METHOD FOR TELESCOPIC IMAGING OF DIM OBJECTS NEAR BRIGHT OBJECTS

CROSS-REFERENCE TO RELATED APPLICATION

This application claims the benefit of and priority to prior filed Provisional Application Ser. No. 63/456,740, filed Apr. 3, 2023, entitled System and Method for Telescopic Imaging of Dim Objects Near Bright Objects, and claims benefit of and priority as a Continuation-in-Part application to prior filed co-pending application Ser. No. 16/782,896, filed Feb. 5, 2020, entitled System and Method for Daylight Imaging of High Altitude Objects, which claimed the benefit of and priority to Provisional Application Ser. No. 62/802,588, filed Feb. 7, 2019, entitled METHOD FOR OBSERVING SATELLITES VIA ILLUMINATION FROM EARTHSHINE, all of which are incorporated herein by reference in their entirety.

GOVERNMENT INTEREST

The invention described herein may be manufactured and used by or for the Government of the United States for all governmental purposes without the payment of any royalty.

FIELD OF THE DISCLOSURE

The present disclosure relates generally to systems and methods for observing satellites or other objects through a telescope and more particularly, to systems and methods configured to reduce glare and/or scattered light in an image to enable imaging of dim objects near bright objects.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Tracking and imaging of artificial satellites is important for ensuring if a satellite is in its expected orbit, inspecting the satellite and so on. Visual observation of artificial satellites during daylight hours is difficult, especially if the view of the satellite includes the sun or the time is near noon. Current methods of daytime imaging utilize solar illumination only, such that typical imaging is performed with the sun as far away as possible. This allows the satellite to be illuminated by the Sun, but only near the hours of dawn or dusk. Glare and/or scattered light in an image is caused by bright sources of light scattering off of telescope structures. Scattered light makes it difficult to observe relatively dim objects when a bright source of light is near, such as the sun. Ground based imaging, or space based imaging, is difficult when you want to observe a dim object in the presence of a brighter source of light. Examples include satellites in cislunar space where the Sun, Moon, or Earth are all potentially bright objects that may scatter light off of a telescope's structures and greatly limit how dim of an object you can observe. Another example are the moons of Jupiter. Jupiter is very bright comparted to its moons and the moons are very close to Jupiter anywhere you are outside the Jovian system.

SUMMARY OF THE INVENTION

Various deficiencies in the prior art are addressed below by the disclosed telescopic apparatus, systems, methods and apparatus configured for daylight imaging of satellites and other objects, a platform/telescope configured for daylight imaging of satellites and other objects, as well as modifications thereto configured to perform specific functions individually and/or in conjunction with other platforms/devices (e.g., radar tracking devices). Prior methods to address scattered light do not consider light scattered off of the secondary housing, spiders, or other objects in the optical beam path. Many times the target of interest is much dimmer than a bright source and this invention improves the Signal to Noise Ratio (SNR) by preventing scattered light from reaching the image plane.

Generally speaking, the various embodiments utilize an optical system configured to (1) avoid scattering light into the beam path associated with the satellite of interest (i.e., the satellite to be imaged) using various light protection structures (e.g., solar shielding/baffling) and/or telescope configurations, (2) processing/filtering light received via the beam path such that wavelengths below a threshold wavelength are ignored, wherein the threshold wavelength comprises the wavelength at which the spectral radiance of the sky is less than the spectral radiance of the satellite of interest (e.g., ~0.7-1.0 um). Optionally calculations of local earthshine/albedos are used to select a location for the telescope (location with more earthshine) and/or a preferred spectral region for operating a telescope (e.g., spectral bp filter settings tuned for local albedos). Various modifications to filters, detectors and the like are contemplated by the inventors.

One embodiment is a system for viewing orbiting or flying objects during daylight hours, comprising: a telescope, configured to receive at an imager a light beam from a portion of sky defined by a field of view (FOV); the telescope including a light protection structure configured to reduce impingement upon the imager of spectral energy outside and/or inside the FOV; the telescope including a filter configured to reduce impingement upon the imager of spectral energy of wavelengths below a threshold wavelength, wherein the threshold wavelength comprises a wavelength at which a spectral radiance of the sky is less than a spectral radiance of the object of interest; the telescope including a control module configured to adapt telescope aim parameters such that at an expected time the FOV includes spectral energy optionally including Earthshine reflected from an object of interest, and configured to cause the imager to capture imaging data associated with the object of interest, wherein the captured imaging data is suitable for use in validating an expected orbit or flight path associated with the object of interest.

In another embodiment, a photon shield is used to reduce glare and/or scattered light in an image caused by bright sources of light scattering off of telescope structures. Scattered light makes it difficult to observe relatively dim objects when a bright source of light is available. No filter is needed for this purpose, but one can be used. If the bright source has different spectral characteristics than the dim target of interest, then the correct choice of filter can help. A photon shield is useful for ground based imaging, or space based imaging, particularly when you want to observe a dim object in the presence of a brighter source of light. Examples include satellites in cislunar space where the Sun, Moon, or Earth are all potentially bright objects that may scatter light off of a telescope's structures and greatly limit how dim of an object you can observe. Another example are the moons of Jupiter. Jupiter is very bright compared to its moons and the moons are very close to Jupiter anywhere you are outside the Jovian system.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
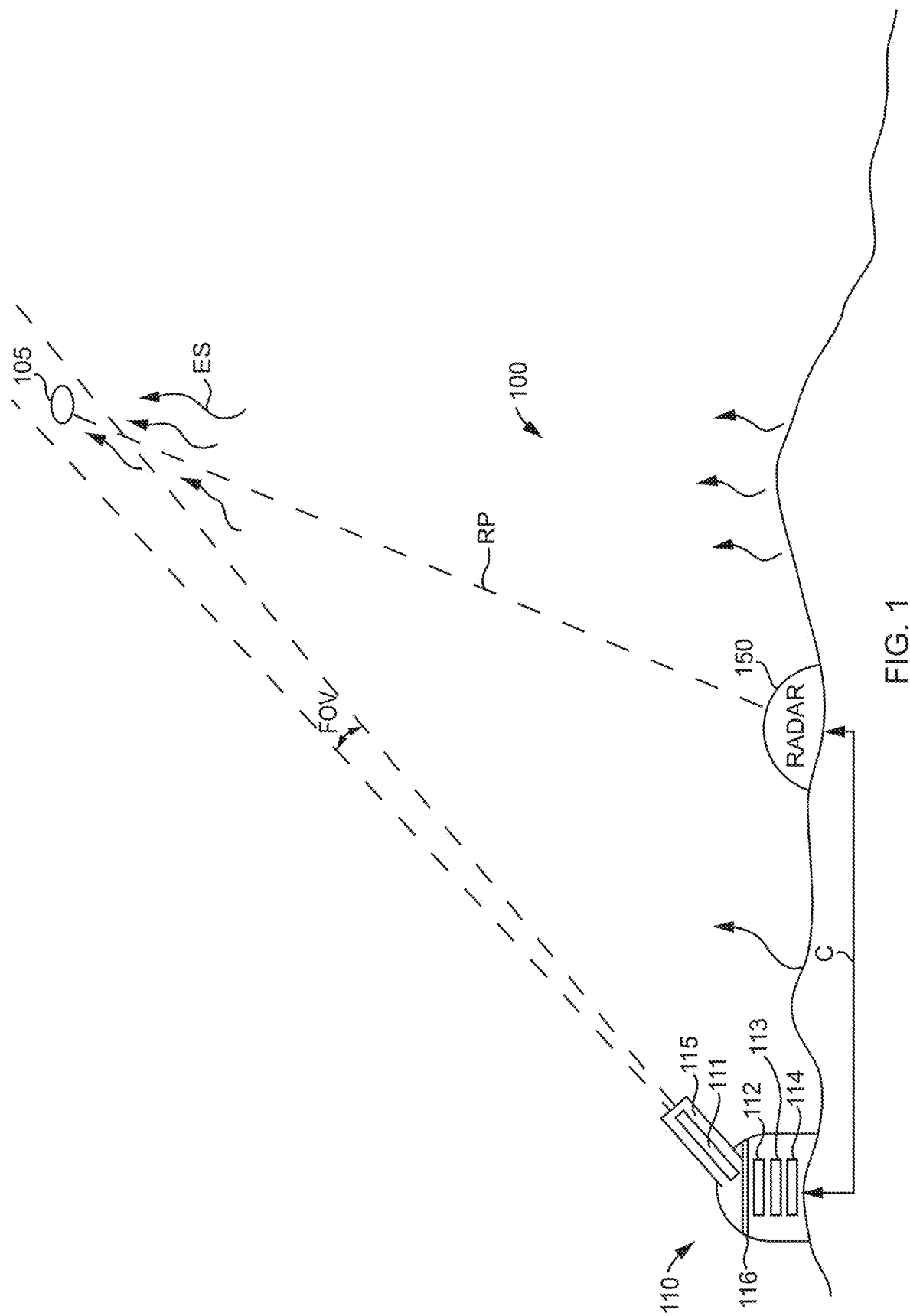
FIG. 1 depicts an imaging system suitable for daylight imaging of satellites according to an embodiment.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for illustrative purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments, such as seismology and data fusion.

Various embodiments are directed to methods for daylight imaging of satellites and other objects, a platform/telescope configured for daylight imaging of satellites and other objects, as well as modifications thereto configured to perform specific functions individually and/or in conjunction with other platforms/devices (e.g., radar tracking devices).

Various embodiments are directed to methods of imaging dim objects near bright objects in space as well as modifications thereto configured to perform specific functions individually and/or in conjunction with other platforms/devices (e.g., radar tracking devices).

Generally speaking, the various embodiments utilize an optical system configured to (1) avoid scattering light into the beam path associated with the satellite of interest (i.e., the satellite to be imaged) using various light protection structures (e.g., solar shielding/baffling) and/or telescope configurations, (2) processing/filtering light received via the beam path such that wavelengths below a threshold wavelength are ignored, wherein the threshold wavelength comprises the wavelength at which the total optical noise (e.g., due primarily to the spectral radiance of the sky) is less than the spectral radiance of the satellite of interest (e.g., ~0.7-1.0 um), (3) reducing the amount of scattered light from bright sources located within the FOV of the telescope using light protection structures (e.g., solar shielding). Optionally calculations of local earthshine/albedos are used to select a location for the telescope (location with more earthshine) and/or a preferred spectral region for operating a telescope (e.g., spectral bp filter settings tuned for local albedos). Optionally, calculations of pointing angle to maximize the distance between the bright and dim object thereby reducing the amount of bright light entering the FOV and thus the beam path. Various modifications to filters, detectors and the like are contemplated by the inventors.

The various embodiments address a number of problems associated with viewing/imaging dim objects near bright objects, even if the bright object is within the FOV of the telescope. Generally speaking, the various embodiments enable viewing of such satellites through optical methods and enable accurate angular measures of the location of such objects in the sky.

By enabling viewing or custody of dim space objects collocated with bright objects through optical methods the various embodiments enable a determination to be made as to whether an object is in its expected orbit or if it has moved away. Observing dim space objects near bright objects solves a long-standing Space Situational Awareness (SSA)/Space Domain Awareness (SDA) problem; namely, low SNR due to the relative brightness of the object of interest and the nearby bright object. In addition to SSA applications, the various embodiments are also applicable to other fields of endeavor, such as astrometrics, astrodynamics and so on by allowing for detection and observation of exoplanetary bodies that traditionally would be difficult.

By enabling accurate angular measures of the location of such satellites in the sky during the daytime, various advantages are provided. For example, low earth orbit (LEO) satellite viewing time may now be increased from about 4 hours per day to 16 hours per day. By combining this angular information with a radar's range information, accurate orbital elements can be determined in a single pass. A radar system by itself requires two passes to determine orbital elements. This greatly increases the efficiency of the radar system. The time efficiency is much greater if one considers that there are usually multiple orbits before a LEO satellite passes over a particular ground station and it may be 12-24 hours before it passes over it again. Therefore, an updated orbital element set can be determined in minutes instead of 12-24 hours. As the angular data from the optical telescope and the range data from the radar system are collected semi-simultaneously, this produces a much better set of orbital elements and eliminates the problem if a satellite maneuvers between the two passes needed for a radar system to determine the orbital elements by itself.

The various embodiments are suitable for use in observing satellites in low earth orbit (LEO), medium earth orbit (MEO), geosynchronous orbit (GSO), and geostationary orbit (GEO). The various embodiments are also suitable for use in observing objects that are orbiting bright bodies inside and outside the solar system.

By enabling inspection of the entire ground facing side of such satellites during the daytime the current methods of imaging LEO satellites while they are Sun illuminated and the imager is in darkness are avoided, which leaves about half of the satellite facing the ground and such that only half of the satellite can be inspected on any given pass. The various embodiments with an adaptive optics system on a telescope can increase the resolution. Additionally, for LEO satellites, the illumination source is so large that very little of the satellite will be in shadow, so the entire bottom side can be inspected.

By enabling the observation of dim objects near bright objects in space, the number of space bodies that can be accurately detected and observed is greatly increased. For example, satellites in a cislunar orbit struggle to accurately observe objects due to the scattered light by the Earth, Sun and Moon. By reducing the scattered light received by the telescope the signal to noise ratio (SNR) can be improved for detecting dim objects in space. This advantage applies to both bright objects outside of the FOV, as well as the case where a bright object is within the FOV.

A 140 degree diameter source (Earth from the viewpoint of LEO) provides sufficient illumination for a LEO satellite. Similarly, a 17 degree diameter source (Earth from the viewpoint of GEO) may be large enough so very little of the satellite will be self-shadowed. This will depend upon the phase of the Earth (Full, Crescent, etc.). The higher the satellite, the smaller the Earth appears. Further, the Earthshine received by a satellite represents a very diffuse light source, which advantageously reduces glare such as from reflections and the like, thereby improving photographic results by retaining satellite feature details. For example, shadows can provide information of the parts casting the shadow, but may also hide sections of the satellite that are in shadow. Having images in both cases will reveal more information. Thus, the various embodiments fund use within the context of LEO, MEO, GSO and GOE satellites as well as flying objects such as planes, missiles and the like.

FIG. 1 depicts an imaging system suitable for daylight imaging of satellites according to an embodiment. Specifically, the system 100 of FIG. 1 comprises a telescope 110 including optical receiving and redirecting components 111 configured to receive optical energy associated with a field of view (FOV) and direct a received light beam through a filter assembly 112 to an imager 113. The telescope 110 also includes a light protection structure 115 configured to reduce impingement upon the imager 113 of light such as solar spectral energy outside the FOV of the telescope, scattered light from various sources, light from bright sources near an object of interest and so on. The telescope 110 also includes various aiming mechanisms 116 for directing the FOV of the telescope to a region of the sky of interest, such as a region of the sky expected to include therein a satellite 105 at a predetermined viewing time.

The telescope 110 includes a control module 114 configured to control the aiming mechanism(s) 116, filter module(s) 112 and/or imager(s) 113 to acquire thereby image information suitable for use in generating image data and other data associated with objects within the FOV, such as a satellite 105 or other orbiting or flying object (e.g., an airplane, cruise missile, spacecraft and the like). The control module 114 may be implemented as a special purpose or general purpose computing device, such as depicted below with respect to FIG. 6.

The light protection structure 115 comprises one or more light shield(s), light baffle(s), fixed/variable apertures, and/or other light limiting structures that are operative to reduce impingement upon the imager(s) 113 of sunlight and other light outside of the FOV of the telescope. In operation, the telescope 110 is aimed in a manner that avoids including the sun within the FOV of the telescope. Generally speaking, a light baffle prevents scattered light entering the telescope from going further down the optical path and contaminating the image plane, while a light shield keeps light from being scattered by telescope structures so that such scattering doesn't occur further down the optical path (i.e., the light is either absorbed by the baffle or reflected back and never has a chance to enter the telescope). It is noted that, in various embodiments, light baffles may be used to help reduce scattered light in addition to a light shield; a light shield may be of primary importance since other baffling mechanisms may themselves become contributors to scattered light if not prevented by the light shield. Additionally, a light shield can be placed on structures in the optical path, such as the secondary mirror housing and the spiders. These structures can scatter more light into the optical path than the telescope tube outside the optical path. It is noted that light shields/baffles are useful for more than solar/day-sky illumination, they are useful any time there is a bright source of light next to a fainter object of interest. The term "baffle" is used in its conventional sense with respect to use in telescopes, as a surface provided internal to a telescope tube for blocking and absorbing light. An exemplary baffle is a ring made of thin plastic or metal that is attached inside of the telescope tube and is painted in a black matt finish to further absorb unwanted light, and more than one such baffle can be attached along the length inside the telescope tube. Another example of a baffle is a baffle tube to prevent light entering the telescope tube from directly passing through the primary mirror in a Schmidt-Cassegrain telescope. An example of a light shield is a photon shield placed proximate the entrance of the telescope tube, blocking light from entering the telescope tube to prevent light scattering off the secondary mirror and spider. Irrespective of whether the bright source of light is in or out of the telescope FOV, the light from the bright source can scatter off the telescope parts and reach the image plane (e.g., viewing a relatively dim object optically near the Moon or Jupiter). Thus, various types of light or solar shields, baffles, lattice structures and the like may be employed to implement the light or solar shielding functions described herein.

The filter(s) 112 is configured to reduce impingement upon the imager of spectral energy of wavelengths below a threshold wavelength, wherein the threshold wavelength comprises a wavelength at which the total optical or spectral noise (e.g., due primarily to the spectral radiance of the sky being less than a spectral radiance of the satellite of interest). The filter 112 may comprise a fixed filter or an adjustable filter (e.g., a filter assembly wherein one of a plurality of available filters may be selected for use by the control module 114). Filter selection may be made via the control module 114 in view of various parameters, such as imager characteristics, light characteristics and so on as discussed herein.

The imager(s) 113 is configured to convert incident light into digital information for subsequent processing such as by the control module 114 and/or other image processing apparatus (not shown) within the telescope installation and/or other systems such as remote processing systems at universities, a broader SSA system and so on (not shown). The imager 113 may comprise a fixed imager or an adjustable imager (e.g., an imager assembly wherein one of a plurality of available imagers may be selected for use by the control module 114). Imager selection may be made via the control module 114 in view of various parameters, such as filter characteristics, light characteristics and so on as discussed herein.

For example, due to the easy availability of silicon detectors for imaging devices or portions thereof (e.g., cameras, photodetectors and the like), one of the spectral ranges well selected for observing satellites via Earthshine is in the very near infra-red (IR) wavelength range of about 0.7 to 1.0 μm. In other embodiments, the spectral range selected may be at or near 2.5 μm due to the relatively high signal to noise ratio (SNR) related to the minimum in the sky brightness at that wavelength. In various embodiments, the imagers/detectors 113 may comprise, illustratively, Silicon (Si) photodetectors, Indium Arsenide (InAs) photodetectors, gallium arsenide (GaAs) photodetectors and/or other types of photodetectors. Since each of the various photodetector technologies is associated with a respective detectivity characteristic (D*), various embodiments in which differing detection bands are used may be implemented with photodetectors having a detectivity characteristic more suitable to the detection band used in the embodiment.

Various embodiments contemplate the use of imagers/detectors 113 in a wavelength range of 0.7 to 2.5 μm. Additionally, for orbiting cameras, Earthshine can be used outside the 0.7-2.5 so that other/additional imagers/detectors 113 may be used that are not sensitive in that band. Useful imagers/detectors 113 may also include, in some embodiments, those based upon the following materials: Indium gallium arsenide (InGaAs), Germanium (Ge), Lead sulfide (PbS), Indium antimonide (InSb), Mercury cadmium telluride (MCT), Lead selenide (PbSe), Photovoltaic Mercury Cadmium Telluride (PV MCT) and so on. Other materials/technologies of interest include Quantum Well Infrared Photodetector (QWIP), Lithium tantalite (LiTaO3), and Triglycine sulfate (TGS).

Various embodiments contemplate that combinations of different optical systems, including different optical receiving and redirecting components 111, different photometric filters 112, and/or different imagers/detectors 113 may be used depending upon telescope location and desired operating parameters.

For example, various embodiments contemplate optical receiving and redirecting components 111 utilizing larger optical apertures, such as greater than 5 cm, 10 cm, 100 cm or more, to allow more light to enter the telescope, using a smaller FOV so that a distant object of interest (e.g., a satellite) may be arbitrarily close to the Sun but the Sun is not in the FOV, and/or longer focal ratio instruments such that spectral/optical noise from the sky back ground is reduced.

In various embodiments, to improve the speed and accuracy of aiming the telescope towards a satellite 105 or other object(s), the control module 114 utilizes respective ranging and/or position information RP derived via a radar site 150 or other RADAR/LIDAR apparatus in communication C with the telescope 110.

Generally speaking, the control module 114 is configured to adapt telescope aim parameters via the aiming mechanism 116 so that the FOV of the telescope includes an orbiting/flying object to be verified/observed (e.g., a satellite of interest such as satellite 105 or some other orbiting/flying object) at an expected viewing time. The expected location of the sky and expected viewing time of the orbiting/flying object to be verified/observed may be determined by the control module 114 (or other computing device) based on calculations/observations associated with an object of interest's range, orbit, flight, trajectory, ballistic characteristics, anticipated actions and the like. In various embodiments, the controller 114 is configured to adapt one or more optical receiving and redirecting components to adapt thereby the FOV of the telescope.

Various embodiments contemplate using an estimated angular position (such as from RADAR or LIDAR, or from past orbital parameters) to determine a precise angular measurement associated with an object of interest. The precise angular measurement may be combined from measurements/data from telescopes at multiple locations, or multiple orbital passes of an object of interest over one or more telescopes, to determine thereby the precise range/position of the object of interest. Radar may also be used to very accurately determine the range of an object of interests. Orbital parameters may be calculated from the angular measurements and the range measurement(s). The range information is not needed for an optical telescope to be able to see a satellite; the position information enables rapid acquisition of the satellite by a telescope.

The control module 114 is configured to cause the aiming mechanism 116 and, optionally, one or both of the filter(s) 112 and imager(s) 113 to be adapted to receive and process FOV light at the expected time to provide thereby verification/observation of the orbiting/flying object of interest. In various embodiments, the control module is further configured to provide tip/tilt correction of optical system components in response to received imagery associated with the object of interest so as to achieve higher order satellite location/aiming corrections and improved image resolution. The control module may further use laser guidance in combination with the tip/tilt correction of optical system components.

In various embodiments, the control module 114 refines the expected location/viewing time determination using position information associated with the object of interest. For example, a calculated position of the satellite 105 with respect to the radar site 150 may be compared to an actual position generated by the radar site 150 to determine thereby whether or not the satellite is conforming to an expected orbit and, therefore, will be located within the FOV of the telescope 110 at the predetermined viewing time. Differences between the calculated position and actual position may be used to recalculate the expected location of the satellite 105 and expected viewing time such that the aiming mechanism 116 may be adjusted by the control module 114 to ensure that the satellite 105 is likely to be located within the FOV at the expected viewing time. That is, the control module 114 may be configured to modify the determined location and/or time in response to respective satellite position information provided by a RADAR, LIDAR or other ranging source 150.

As depicted in FIG. 1, the underside of the satellite 105 is illuminated by Earthshine ES caused by reflection sunlight from the ground. While not specifically depicted in FIG. 1, it is noted that the sun is providing sunlight that is reaching the ground (depending on cloud cover) and that the sun is not located within the FOV of the telescope 110. The Earthshine ES illuminating the satellite depends upon the amount of (primarily) sunlight reflected from the earth toward the satellite 105.

The telescope 110, and methods of using the telescope, enable the detection and/or viewing of space objects or flying objects during the daytime (and twilight) by reflecting Earthshine (solar illumination reflected by the Earth) in wavelength bands 0.7 μm and longer through the use of optical filters to provide improved and rapid detection, imaging, and tracking of such objects. Observations from the ground benefit from selecting wavelength bands where the atmosphere is relatively transparent and where the day sky is dimmer. Optical instruments and detectors are selected for the photometric band utilized. Integration times will depend upon the aperture of the primary optic, with larger apertures requiring smaller integration times. Optical baffling or other modifications to the telescope optical system greatly reduce scattered light from the Sun and day sky.

Various embodiments contemplate configuring the filter(s) 112 for utilizing longer wavelength bands 24/7 operation may be maintained by emissive Earthshine (Earth emitting illumination). Further, multiple filters associated with respective photometric bands may be disposed upon a filter wheel such that the control module may change filters, and therefor change photometric bands, as needed for the illumination conditions of Earthshine.

Various embodiments contemplate utilizing imager(s) 113 such as Near IR cameras, Shortwave IR cameras, Midwave IR cameras, and/or Longwave IR cameras. Further, these cameras may be configured for using the photometric bands in those wavelengths, including both current and potential/future bands.

Various embodiments contemplate utilizing instrument clusters including a dewer window.

Various embodiments contemplate utilizing an Adaptive Optic (AO) system to provide detail on resolved images of space objects or other objects. It is noted that Earthshine is advantageously a diffuse illumination source such that no deep shadows will be produced (e.g., as is the case with illumination from Sunshine). In essence, the various embodiments may use Earthshine in a manner similar to a "fill flash" in photography (or multiple illumination sources) to remove shadows from the photographer's subject. The AO system may utilize the space object or other object of interest as a guide "star" for overall tip/tilt correction of the telescope, for higher order corrections, or in combination with a laser guide star to achieve higher order corrections and improve the resolution. In various embodiments, if the satellite or other object of interest is bright enough, it is optionally used to correct for higher order aberrations. If it isn't bright enough, then a laser guide star may be used to correct for higher order aberrations. It is noted that a laser guide star is typically incapable of providing over all tip/tilt correction since the laser beam travels up through the atmosphere (which tips/tilts the beam) and then back down through the atmosphere (which tips/tilts the beam back to where it was).

Various embodiments contemplate the above described systems and methods, but with no limit on the wavelength for observations from space. By being above the sky, the sky and therefore spectral radiance noise associated with the sky is removed and there are no atmospheric absorption bands to impede observations.

Various embodiments contemplate that combinations of different optical systems, different photometric filters, and/or different imagers/detectors may be used depending upon telescope location and desired operating parameters. For example, due to the easy availability of silicon detectors for cameras and other imaging devices, one of the spectral ranges well selected for observing satellites via Earthshine is in the very near infra-red (IR) wavelength range of about 0.7 to 1.0 μm. In other embodiments, the spectral range selected may be at or near 2.5 um due to the relatively high signal to noise ratio (SNR) related to the minimum in the sky brightness at that wavelength.

Thus, in various embodiments the Earthshine ES is used as a lighting source for viewing the satellite 105, rather than being viewed as a contaminant to such viewing. Further, as will be discussed below, the use of Earthshine ES in combination with the specific optical system design and further in combination with a particular spectral range is used to maximize the signal to noise ratio (SNR) of satellite images generated by the telescope 110. When combined with a radar system, the invention improves the calculation of orbital elements of satellites, reducing to one pass the data needed to compute the orbital elements. This reduces the time to about 10 minutes from over 12 hours. The various embodiments improve upon the inspection of satellites by utilizing a source that fully illuminates the groundward facing side of the satellite (e.g., rather than waiting until twilight for such inspection).

The telescope 110 is configured for operation in accordance with a method that allows imaging of satellites during the daytime, even with the Sun close to the FOV, by utilizing Earthshine and various key technical elements as described herein. Generally speaking, the various embodiments are configure to (1) reduce or avoid having light scattered into the beam path by the optical system; (2) utilize optical filter(s) 112 and imager(s) 113 configured to select light wavelengths tending to reduce the sky background and ensure that the image is that of an atmospheric window; and (3) understand and optimize imaging methodologies and components in view of the relevant sources of Earthshine impinging on satellites at a given location, time of day, weather condition and so on.

The telescope 110 and/or various embodiments are configured to reduce or avoid having light scattered into the beam path by the optical system, such as the optical receiving and redirecting components 111. This can be accomplished with an optical system that does not have any obstructions (e.g. a spider or secondary mirror) in the beam path, so light cannot scatter from the obstructions or otherwise be directed into the beam path. Additionally, the surfaces (particularly the initial light receiving surface) should be relatively free of imperfections so that very little light is scattered from such imperfections. Examples of such optical systems include the following; an off axis telescope such as a solar telescope, a telescope with a long baffle so the spider/secondary is not illuminated by the Sun, a light protection structure such as a light/solar shield or aperture before the spider and/or secondary so neither the Sun nor the sky illuminate these structures, or a baffled high quality sports lens which has very few imperfections within the lens. These and other types of optical systems are suitable for use in implementing a telescope 110 in accordance with various embodiments.

The telescope 110 and/or various embodiments are configured to utilize optical receiving and redirecting components 111, optical filter(s) 112 and/or imager(s) 113 configured to select light wavelengths tending to reduce the sky background and ensure that the image is that of an atmospheric window (i.e., 'looking' through an atmospheric window). Specifically, is well known that the blue day sky is caused by Rayleigh scattering. The amount of the scattering varies inversely with the wavelength to the forth power, as noted by the following equation where $I_0$ is the incident intensity of light, $\lambda$ is the wavelength of light, and $I_R$ is the amount of light scattered by Rayleigh scattering.

$$I_R \propto \frac{I_0}{\lambda^4}$$

Figure 3:
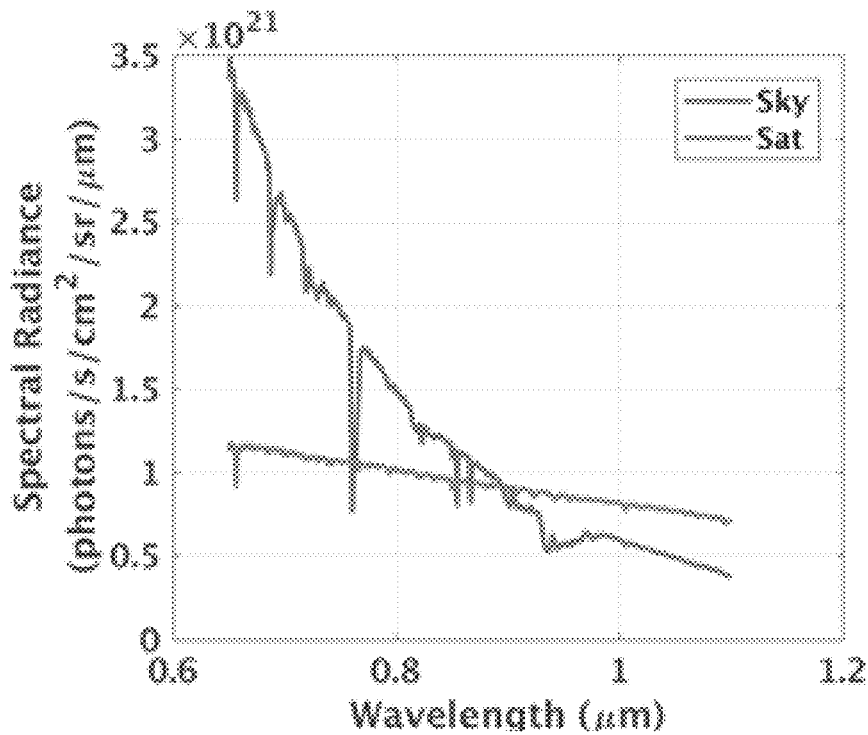
FIG. 3 graphically depicts spectral radiance as a function of wavelength for illustrative sky and satellite imagery.

FIG. 3 graphically depicts spectral radiance as a function of wavelength for illustrative sky and satellite imagery. Specifically, as shown in FIG. 3, the longer the wavelength, the darker the day sky. However, other factors cause the day sky brightness to increase for wavelengths longer than ~2.5 µm (not shown). Additionally, the day sky brightness varies with atmospheric conditions and depends upon water vapor, ozone, $CO_2$, CO, and $CH_4$, as well as aerosols. The lower curve in FIG. 3 (for this exemplary day and location) shows the brightness of an ES illuminated LEO satellite as a function of wavelength. It can be seen that the spectral radiance of the satellite actually becomes brighter than the total spectral/optical noise of the image (e.g., sky) at about 0.9 µm.

For most daytime images, the primary sources of image noise are the shot noise of the photons coming from the sky, and the shot noise of the photons coming from the satellite. For an object that extends over many pixels of an image, there is an accumulation effect of all the signal from the pixels and all the noise from the pixels (e.g., square root of the sum of the squares). Specifically, an object of interest may be significantly fainter than the sky as long as its image signal exceeds the total noise associated with the image signal. In various embodiments a criteria of a signal to noise ratio (SNR) of 3:1, 4:1 or 5:1 may be selected to state a claim that the object has been detected. It is noted that high quality detectors are generally limited by the noise from the spectral sky radiance, whereas low quality detectors may be limited by the dark noise of the detector itself.

It is noted that the various embodiments and descriptions thereof use the term "brightness" and similar terms. It will be appreciated that brightness is a physical concept defined in terms of energy per time, per solid angle, per area, and per wavelength (for spectral brightness), whereas measurements of brightness as described herein are more accurately described within the context of measuring/collecting photoelectrons. Brightness as a concept depends upon various factors such as telescope size, exposure (aka integration) time, filter bandwidth, and so on.

Generally speaking, it is possible to see things that are fainter than the sky (depending upon the embodiment), and the discussion herein with respect to improved relative "brightness" of an object at 0.9 µm is simply a statement that the object is visible because it is brighter than the sky. Other objects, other locations, other sky images may have wavelength cutoffs different than the 0.9 µm discussed in the exemplary embodiments. Thus, various embodiments include a step of measuring image noise or spectral content such that a wavelength cutoff of 0.9 µm, 0.7 µm, 0.8 µm and the like may be selected for use.

The telescope 110 and/or various embodiments are configured for operation using an understanding of the relevant sources of Earthshine impinging on satellites at a given location (e.g., location of telescope 110), time of day (e.g., of the proposed time of viewing), weather condition (e.g., at the location of telescope 110 at the proposed time of viewing) and so on. Specifically, the Earth is a very varied surface. The albedos of features (e.g., water, clouds, land, etc.) vary spectrally. The features and their albedos, depend upon location, weather, and even time of year.

Figure 4:
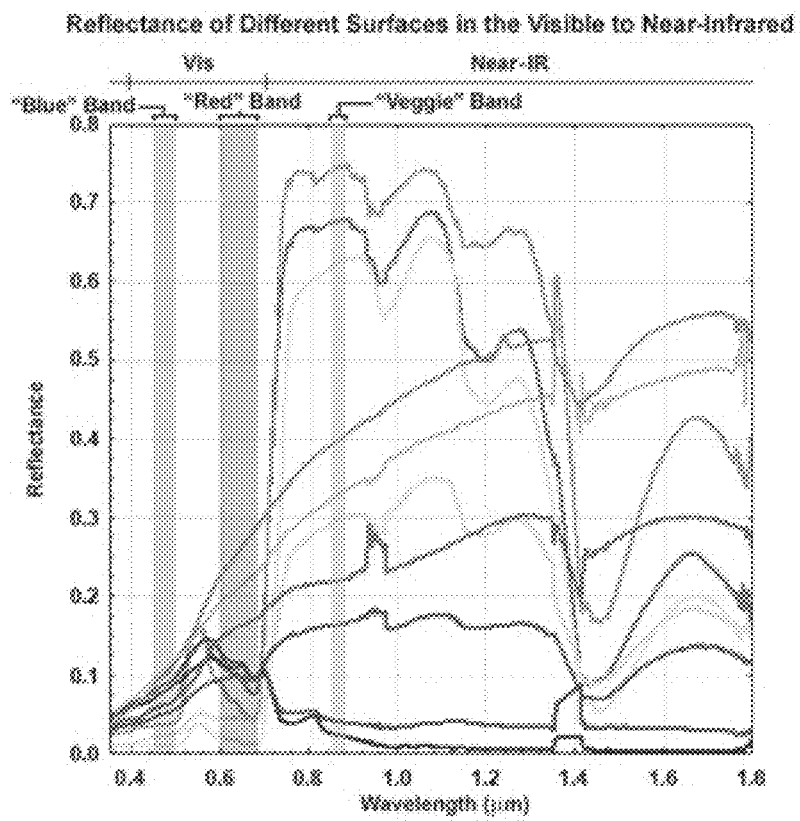
FIGS. 4-5 graphically depict albedos of some common Earth features.
Figure 5:
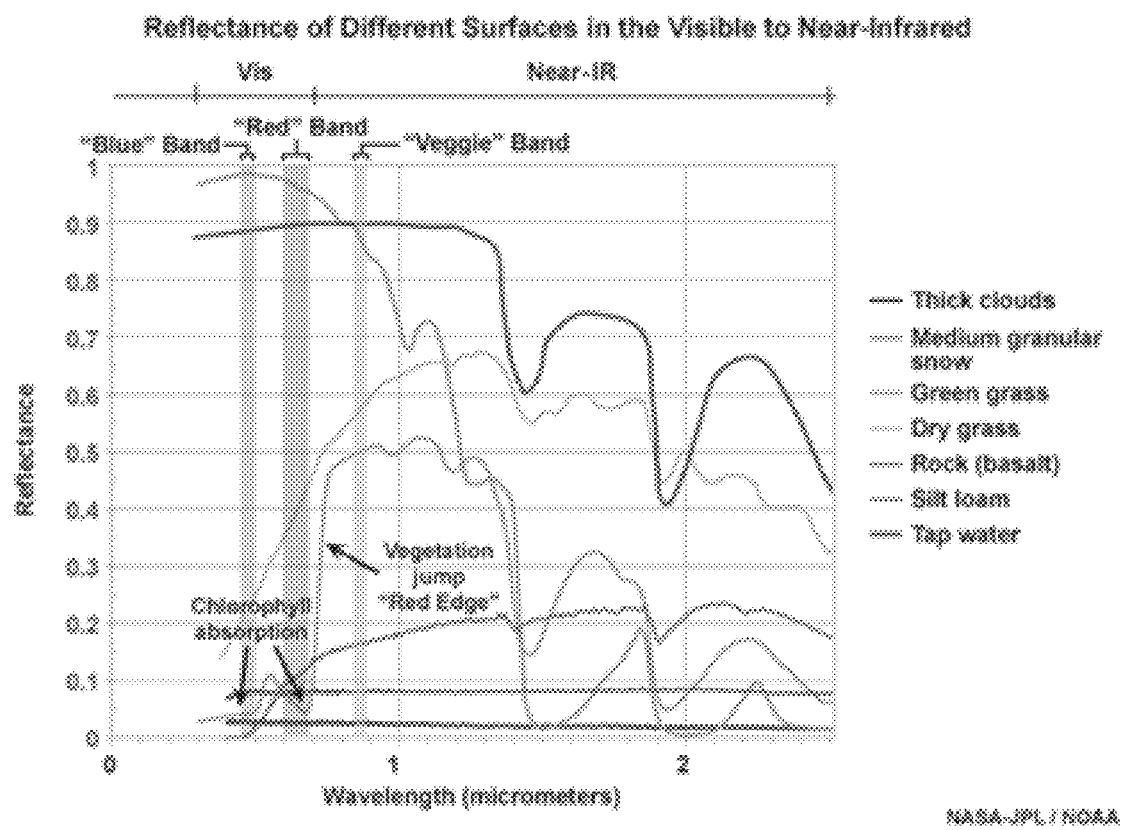

FIGS. 4-5 graphically depict albedos of some common Earth features. Specifically, FIG. 4 depicts reflectance as a function of wavelength for a number of different earth surface features, such as, from top to bottom at the so-called "veggie" band: soybean, pine trees, grass, sand, loessal soil, wheat, red soil, bare rice paddy field, turbid water, and moderately turbid water.

The Earthshine associated with the telescope 110 is related to the surface features near the location of the telescope 110. Further, in various embodiments the filters(s) 112 of the telescope 110 are selected to provide a spectral bandpass that increases the amount of earthshine provided to the imager 114 such to improve Earthshine related imaging of a satellite 105.

The inventor notes that the spectral albedos become much higher in the near infra-red (IR) wavelength region. For example, Maui is surrounded by water and has an average albedo of about 0.05 or less. However, Albuquerque is surrounded by dirt, trees, and sand, the average albedo is much higher about 0.5. Generally speaking, the amount of Earthshine hitting a satellite or other object depends upon the location of the satellite/object and how much of the Earth it can view (i.e., how much of the Earth is able to contribute Earthshine), which includes the location of the telescope. For example, assume that a large orbiting object such as the international Space Station (ISS) has a 10 degree horizon view forming a circle that is located at, and a little larger than, the state of New Mexico. In this example, White Sands National Monument about 200 miles south will contribute Earthshine. The 10 degree horizon circle is about 85% of the total solid angle of the Earth that the satellite can view. So while some light can reach the satellite/object from farther away (i.e., outside the 10 degree horizon view), a 10 degree horizon view is sufficiently inclusive of the Earthshine of relevance to the various embodiments. Larger or smaller horizon views are also contemplated by the inventors (e.g., 5 degrees to 15 degrees), though larger than 10 degrees does not yield much additional information for the various embodiments described herein.

FIG. 5 depicts reflectance as a function of wavelength for a number of different earth surface and atmospheric features such as, from top to bottom at the so-called "veggie" band: thick clouds, medium granular snow, dry grass, green grass, silt loam, rock, and tap water. Three interesting albedos considerations are water, clouds, and the vegetative red edge. Water has an albedo of near 0.15 in the blue, but drops to near zero for wavelengths longer than 0.7 $\mu$m. Clouds have albedos near 0.9 out to about 1.5 $\mu$m, and drops slowly at longer wavelengths. Further, the vegetative red edge depicted in FIG. 5 is not widely known. It occurs because plants are unable to use photons with a wavelength longer than ~0.7 $\mu$m for photosynthesis.

Figure 6:
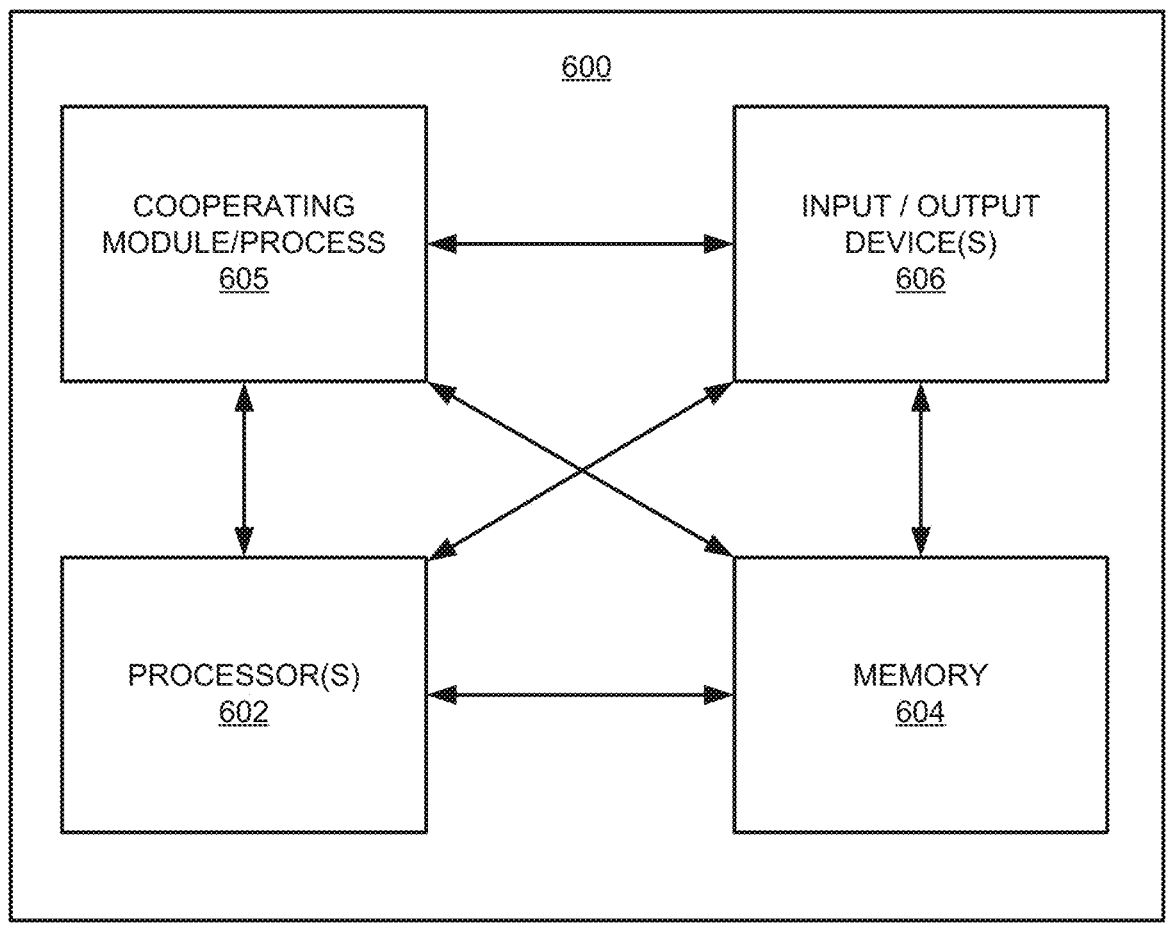
FIG. 6 depicts a high-level block diagram of a computing device suitable for use within the context of the various embodiments.

In FIGS. 5-6, for various plants the spectral albedo has a large jump near 0.7 $\mu$m. Because of this, images in the very near IR (0.725-0.850 $\mu$m) are able to collect daytime images of satellites with a silicon camera in, for example, New Mexico. Longer wavelengths only increase the SNR as the day sky intensity decreases faster than the albedo drops. Except for the presence of spectral lines (e.g., due to water vapor, CO, $CO_2$, or aerosols), having a higher albedo will increase the amount of Earthshine available to illuminate a satellite.

Various embodiments contemplate that the spectral region to be observed is just short of 2.5 $\mu$m, as this is where the sky brightness has dropped to a minimum. Various embodiments contemplate a telescope location in the middle of a pine forest since pine trees have a high albedo and do not change much over the course of the year, or in a location having a low water vapor amount such as is often found in the American West, or in a location with relatively light cloud cover. Various embodiments contemplate adjusting satellite viewing times in response to cloud cover predictions.

The above embodiments are primarily discussed within the context of a ground based telescope 110 daytime tracking of satellites, it will be appreciated that other embodiments may be implemented within the context of daytime aircraft observations/optical tracking, cruise missile observation/optical tracking and the like.

Various embodiments comprise a retrofit kit for improving daylight imaging of flying objects performance of a telescope, wherein the telescope is updated with retrofit kit parts such as light protection structures, filters, imagers, control module hardware or a combination of hardware and software and the like to implement the various systems and apparatus described above. For example, a retrofit kit for improving daylight imaging of flying objects performance of a telescope, where the telescope is configured to receive at an imager a light beam from a portion of sky defined by a field of view (FOV), may comprise a light protection structure configured to reduce impingement upon the imager of spectral energy outside the FOV; a filter configured to reduce impingement upon the imager of spectral energy of wavelengths below a threshold wavelength, wherein the threshold wavelength comprises a wavelength at which total spectral radiance noise in an image is less than a spectral radiance of the object of interest in the image; and a control module update configured to adapt telescope aim parameters such that at an expected time the FOV includes spectral energy including Earthshine reflected from an object of interest, and configured to cause the imager to capture imaging data associated with the object of interest, wherein the captured imaging data is suitable for use in validating an expected orbit or flight path associated with the object of interest.

Figure 2:
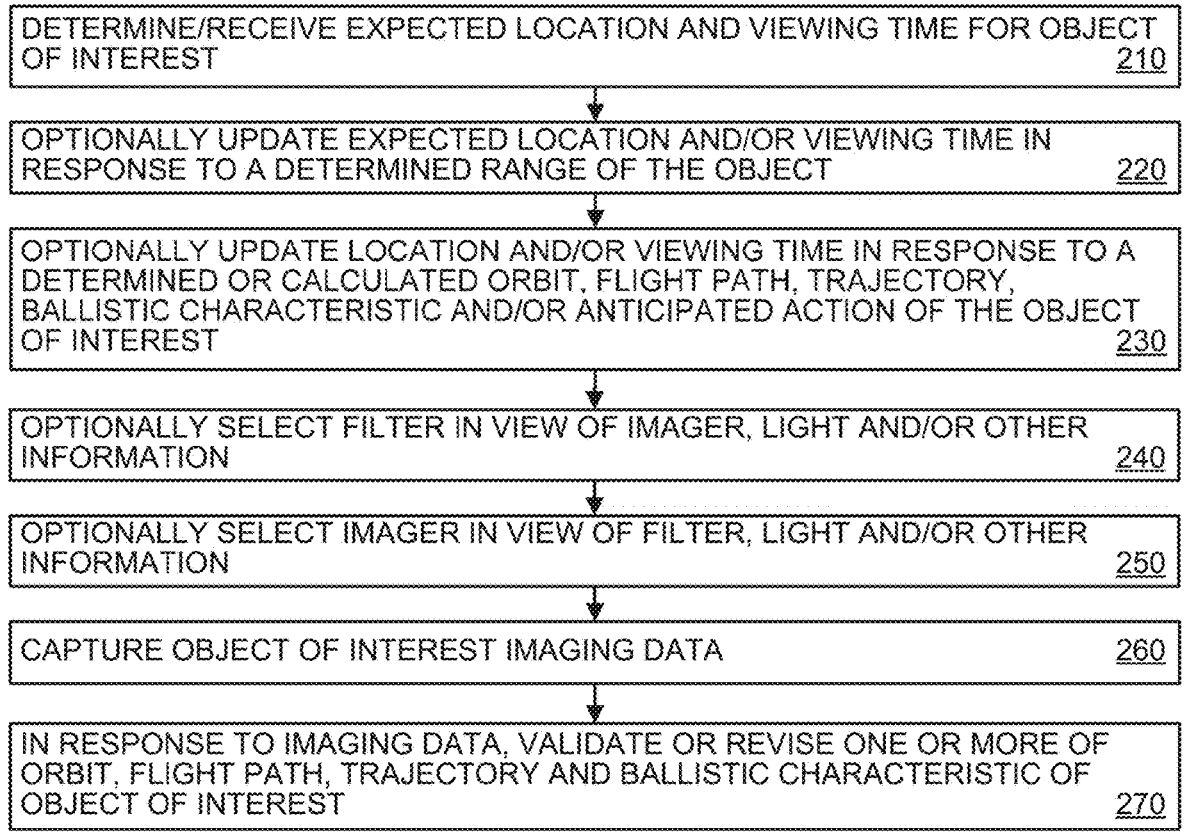
FIG. 2 depicts a flow diagram of a method according to an embodiment.

FIG. 2 depicts a flow diagram of a method according to an embodiment. Specifically, FIG. 2 depicts a method 200 suitable for use by the control module 114 in a telescope 110 such as described above with respect to the various figures.

At step 210, an expected location and viewing time for an object of interest, such as a satellite, plane, missile and so on is received (e.g., from a satellite tasking network) or determined (e.g., by the control module 114).

At step 220, the expected location and/or viewing time is optionally updated in response to a determine position associated with the object of interest (e.g., position to a satellite of interest received from a RADAR or LIDAR installation).

At step 230, the expected location and/or viewing time is optionally updated in response to determined or calculated flight related information associated with the object of interest, such as orbit, flight path, trajectory, ballistic information, anticipated action and/or other information.

At step 240, a filter 112 is optionally selected for use by the telescope 110 in view of imager selection or characteristics, expected light characteristics (e.g., due to albedos, weather and so on), and/or other information.

At step 250, an imager 113 is optionally selected for use by the telescope 110 in view of filter selection or characteristics, expected light characteristics (e.g., due to albedos, weather and so on), and/or other information.

At step 260, imaging information associated with the object of interest is captured.

At step 270, the captured imaging data is responsively used by the control module (or a computing device or system communicatively coupled to the telescope) to validate and/or revise one or more of the orbit, flight path, trajectory and ballistic characteristics of the object of interest.

FIG. 6 depicts a high-level block diagram of a computing device suitable for use in implementing various control elements or portions thereof (e.g., control module 114 and/or other functional elements/modules such as within a telescope 110), and suitable for use in performing functions described herein such as those associated with the various elements described herein with respect to the figures.

As depicted in FIG. 6, computing device 600 includes a processor element 602 (e.g., a central processing unit (CPU) or other suitable processor(s)), a memory 604 (e.g., random access memory (RAM), read only memory (ROM), and the like), a cooperating module/process 605, and various input/output devices 606 (e.g., communications modules, network interface modules, receivers, transmitters and the like).

It will be appreciated that the functions depicted and described herein may be implemented in hardware or in a combination of software and hardware, e.g., using a general purpose computer, one or more application specific integrated circuits (ASIC), or any other hardware equivalents. In one embodiment, the cooperating process 605 can be loaded into memory 604 and executed by processor(s) 602 to implement the functions as discussed herein. Thus, cooperating process 605 (including associated data) can be stored on a computer readable storage medium, e.g., RAM memory, magnetic or optical drive or diskette, and the like.

It will be appreciated that computing device 600 depicted in FIG. 6 provides a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory device, or stored within a memory within a computing device operating according to the instructions.

Figure 7:
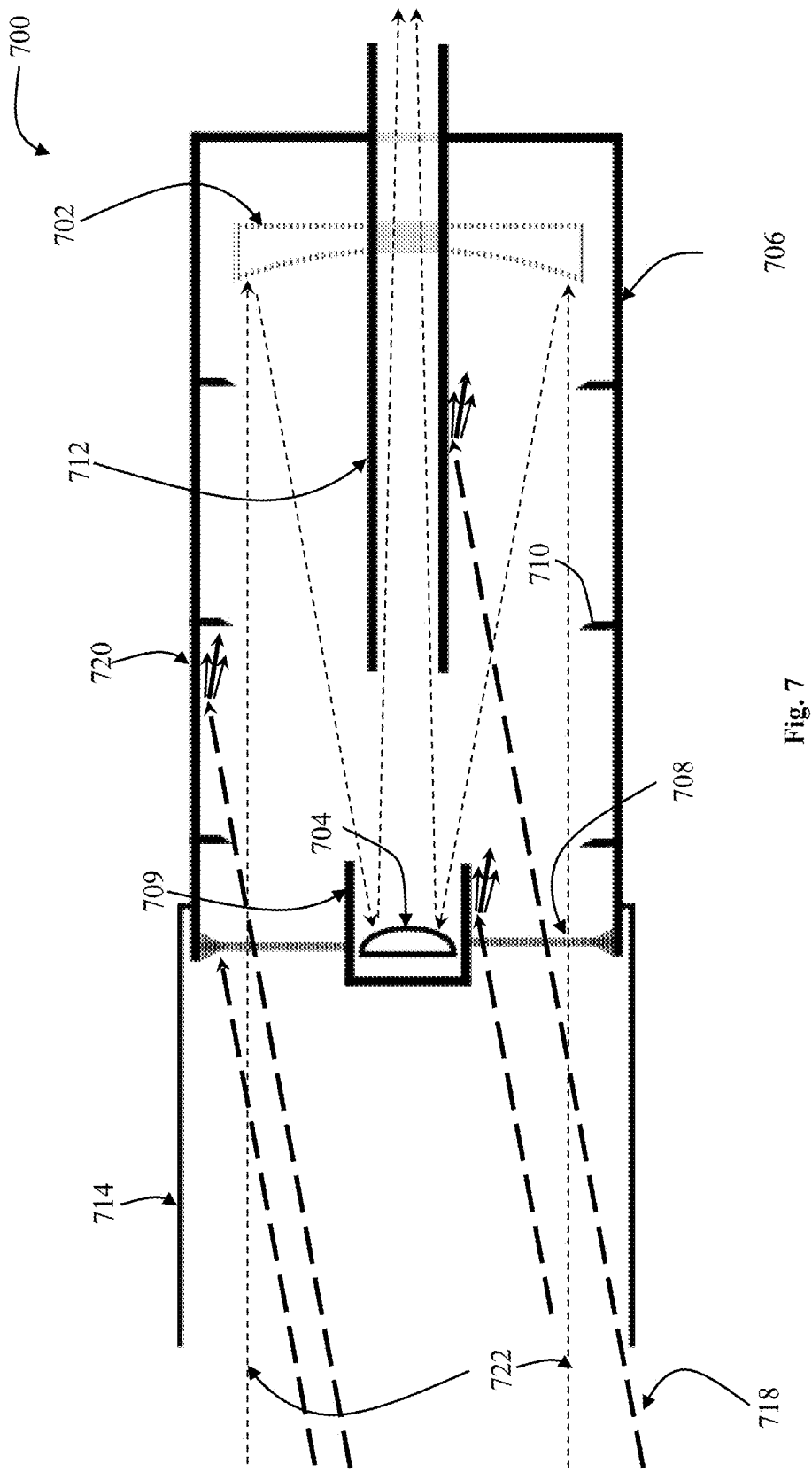
FIG. 7 is an illustration of a Schmidt-Cassegrain telescope.

FIG. 7 depicts an example of a Schmidt-Cassegrain (SC) telescope with cross section 700. The SC telescope includes a primary mirror 702, a secondary mirror 704, a telescope tube 706, and Schmidt-Cassegrain plate 708 supporting a secondary mirror housing 709 in place, the secondary mirror housing holding the secondary mirror in the desired position. This depiction of a SC telescope also includes some exemplary light protection structures for improving the SNR of the optical signal when viewing a bright object near a target of interest. The light protection structures depicted include baffles 710 inside the telescope tube 706 preventing light that may be scattered from the inside of the tube from traveling further towards the primary mirror, a baffle tube 712 preventing light from passing through the primary mirror 702, and a shade 714 preventing light from outside the field of view from entering the telescope. Bright light rays 718 from a bright light source are depicted in darker dash lines causing scattered light 720 while the limits of the desired field of view are depicted by lighter dash lines 722 showing edges of the desired field of view and light rays within that field of view.

Figure 8:
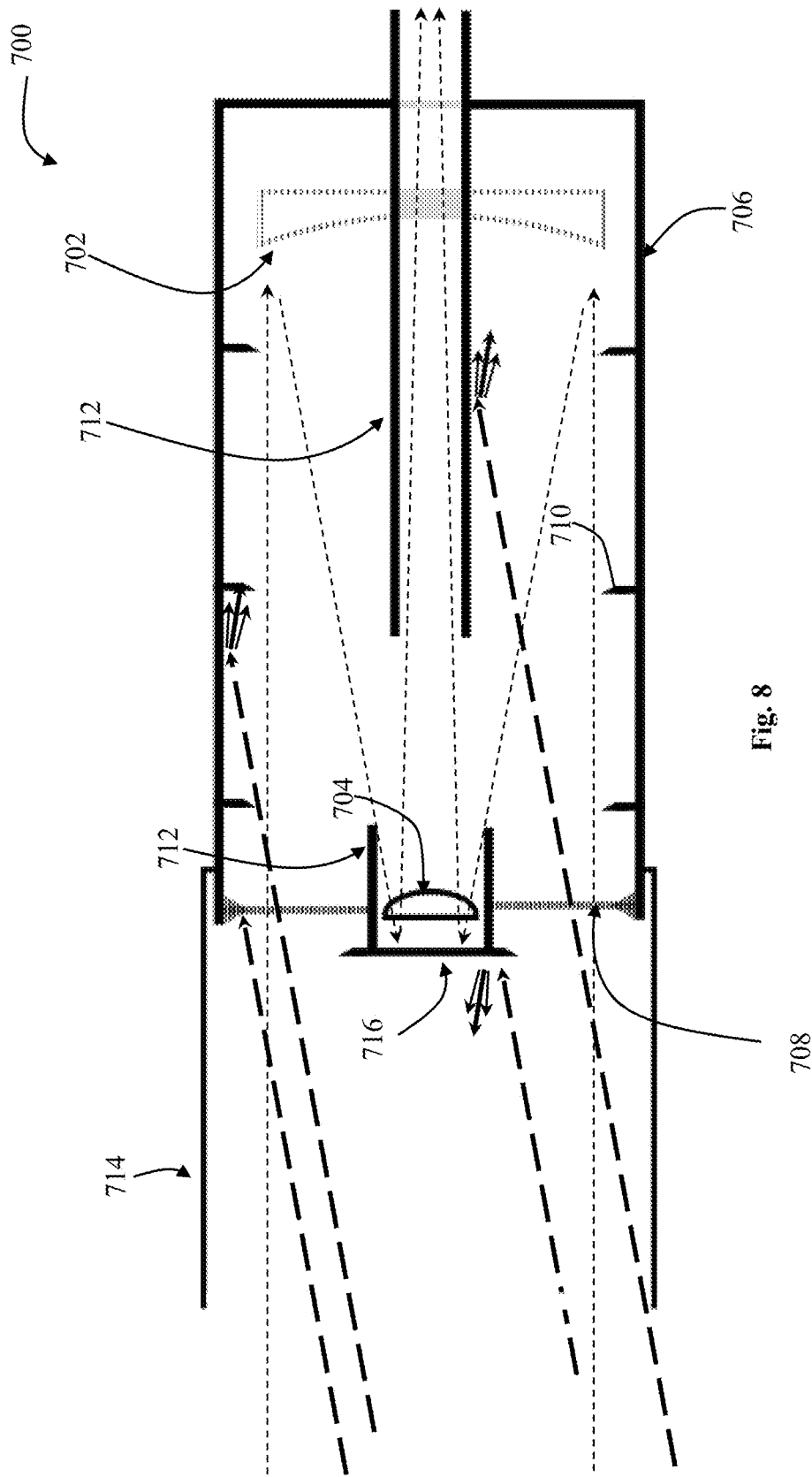
FIG. 8 is an illustration of a Schmidt-Cassegrain telescope having a photon shield.

FIG. 8 depicts the Schmidt-Cassegrain telescope of FIG. 7 with the inclusion of a photon shield 716 added to a face 724 of the secondary mirror housing 709. Bright light near the field of view that would otherwise have been scattered light 720 entering the telescope tube 706 is instead reflected away. FIG. 7 is an illustration of a Schmidt-Cassegrain telescope.

Figure 9:
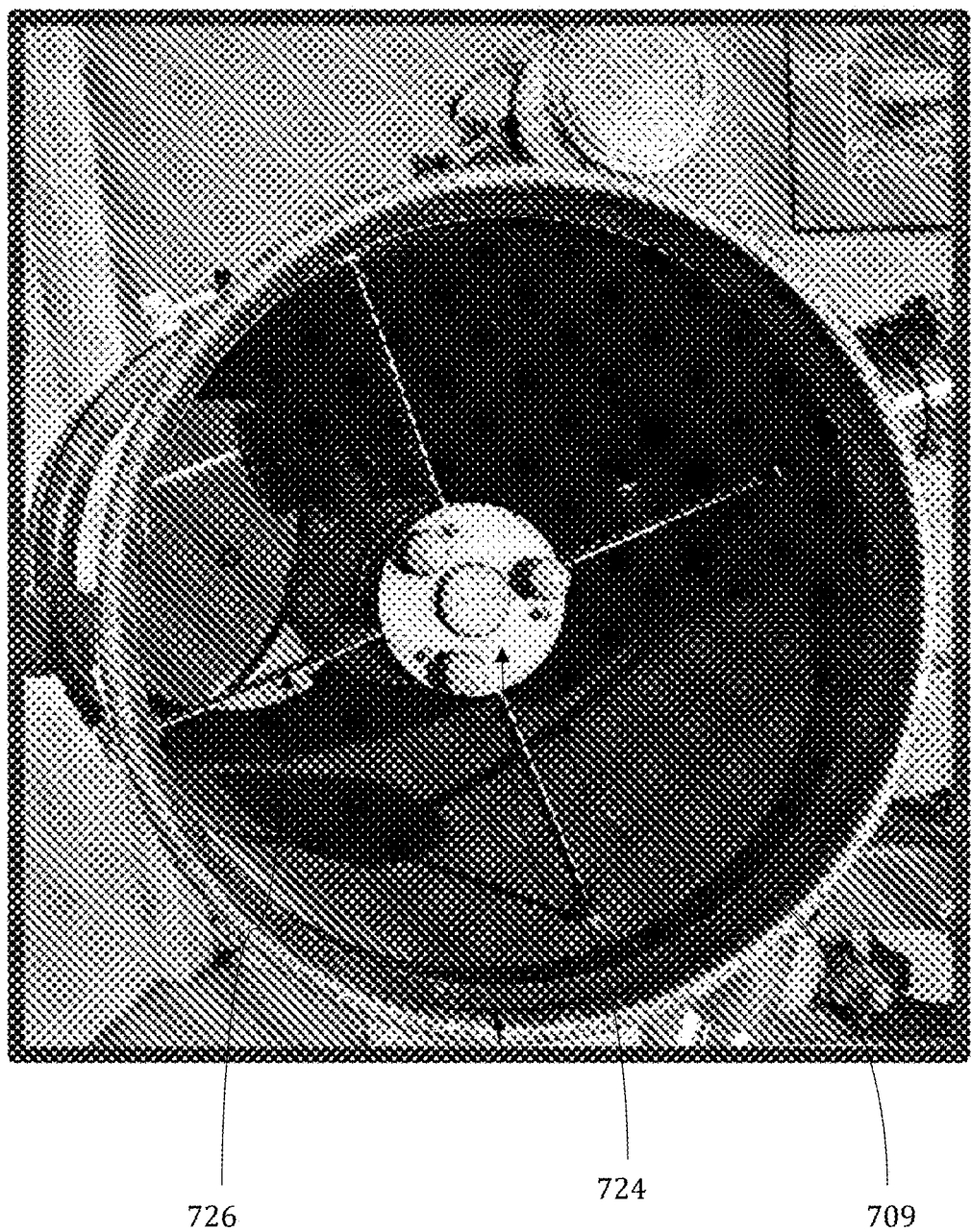
FIG. 9 is a photograph of a Newtonian telescope.
Figure 10:
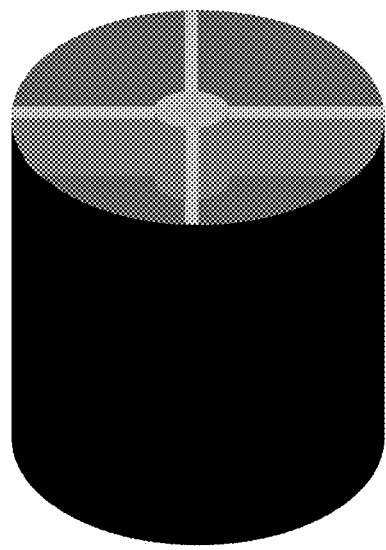
FIG. 10A is an illustration of a Newtonian telescope showing light paths.
FIG. 10B is an illustration of a perspective view of the Newtonian telescope of FIG. 10A.
FIG. 10C is an illustration looking at the Newtonian telescope of 10A along lines 10C-10C.
Figure 10A:
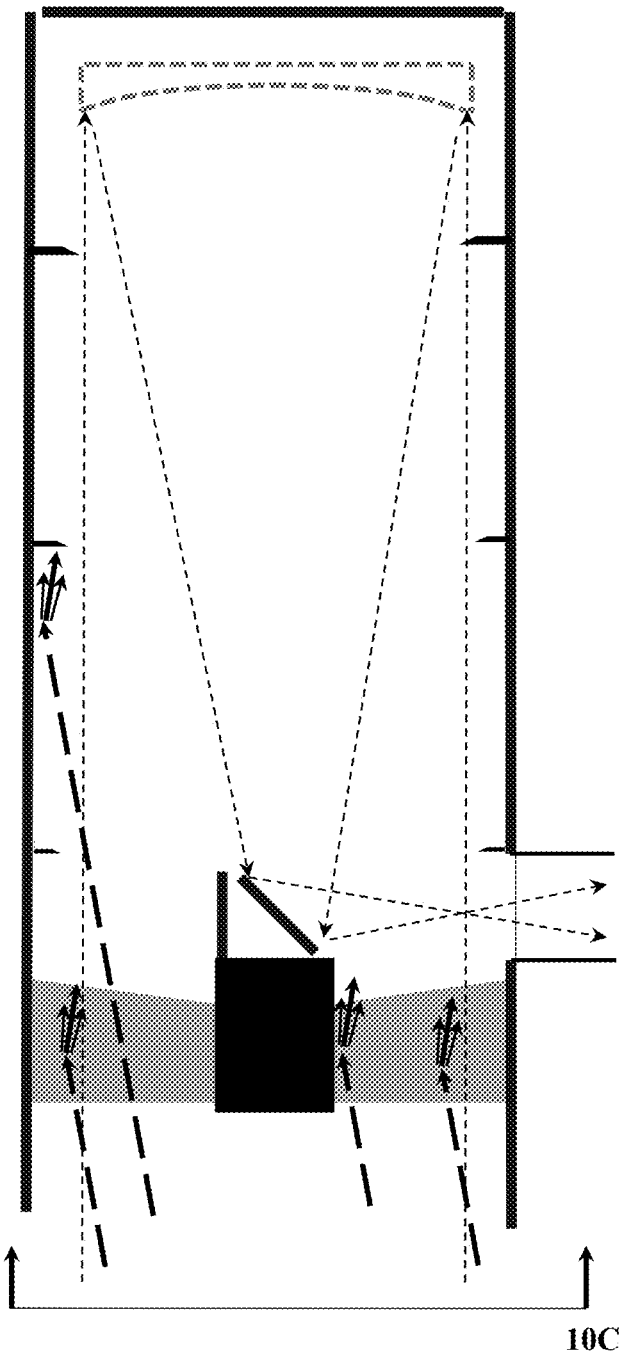
Figure 10C:
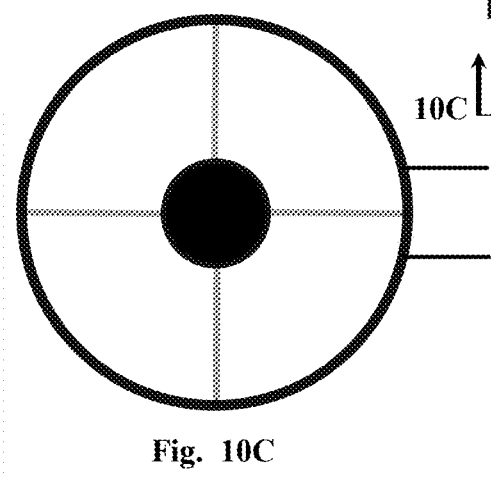

FIG. 9 is a photograph of a Newtonian telescope having struts 726 supporting the secondary mirror housing 709, with secondary housing face 724. FIG. 10A is an illustration of a Newtonian telescope showing light paths. FIG. 10B is an illustration of a perspective view of the Newtonian telescope of FIG. 10A. IG. 10C is an illustration looking at the Newtonian telescope of 10A along lines 10C-10C.

Figure 11A:
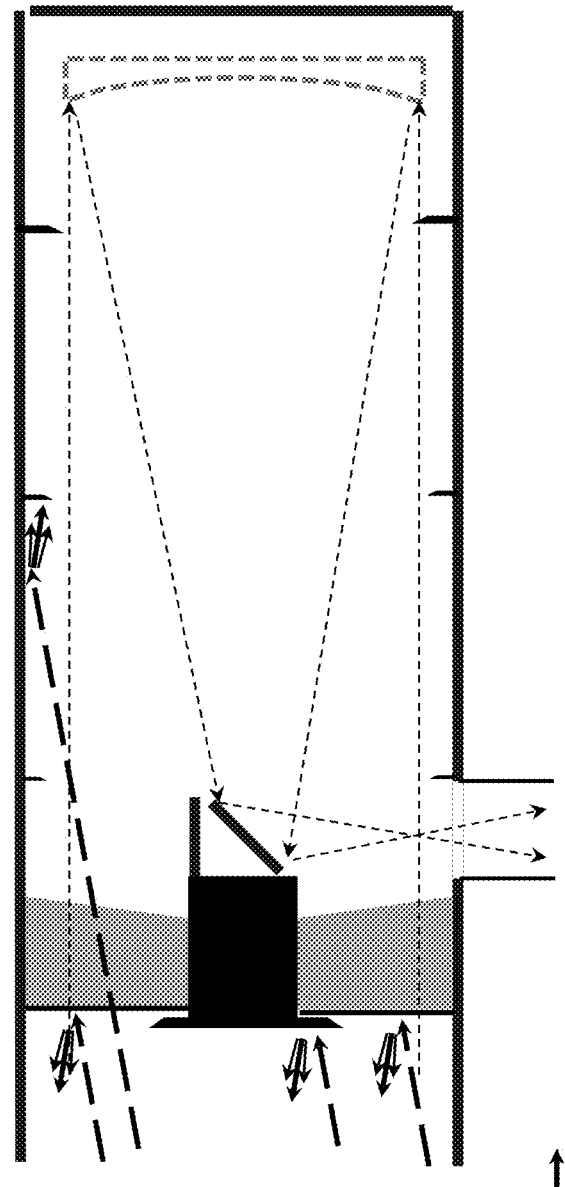
FIG. 11A is an illustration of a Newtonian telescope having a photon shield showing light paths.
Figure 11B:
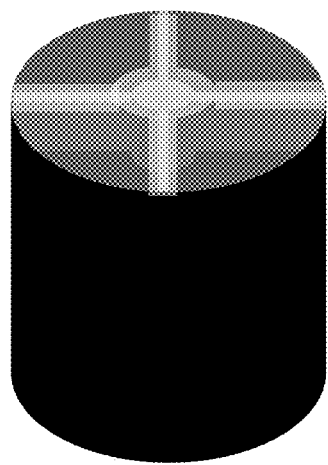
FIG. 11B is an illustration of a perspective view of the Newtonian telescope of FIG. 10A.
Figure 11C:
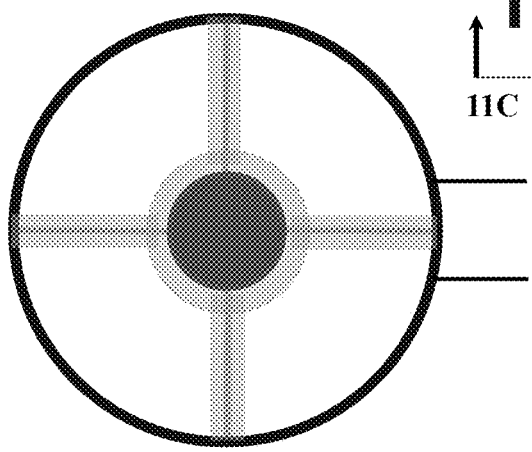
FIG. 11C is an illustration looking at the Newtonian telescope of 11A along lines 11C-11C.

FIG. 11A is an illustration of a Newtonian telescope having a photon shield showing light paths. FIG. 11B is an illustration of a perspective view of the Newtonian telescope of FIG. 10A. FIG. 11C is an illustration looking at the Newtonian telescope of 11A along lines 11C-11C.

Figure 12:
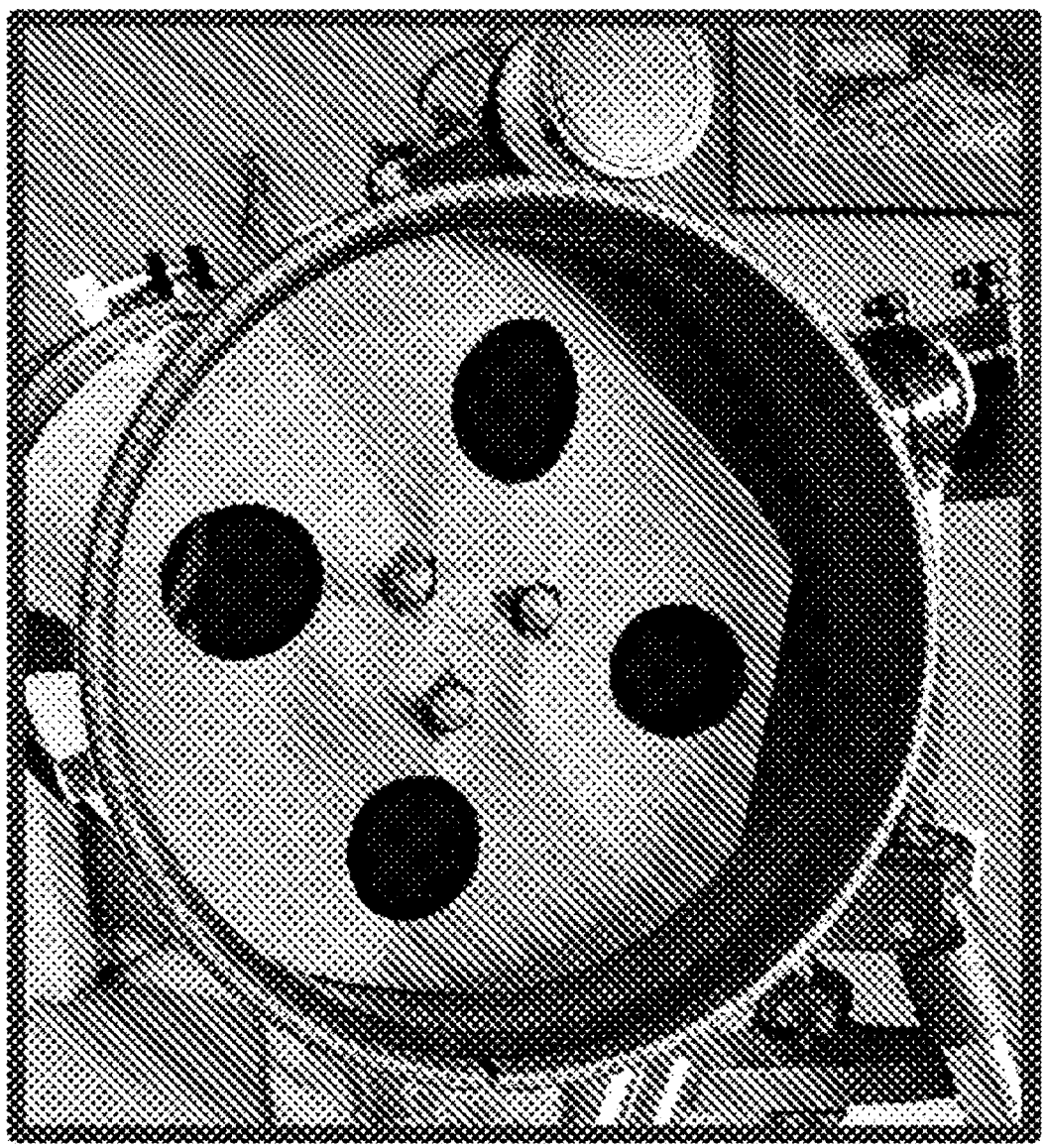
FIG. 12 is a photograph of the Newtonian telescope a FIG. 9 with a prototype photon shield installed.

FIG. 12 is a photograph of the Newtonian telescope a FIG. 9 with a prototype photon shield installed. The prototype was very rough, providing only circular holes cut into paper providing light from the desired field of view through each of 4 holes while all four struts and the face of the secondary mirror housing were covered to block bright light from outside of the field of view to substantially be shielded for scattering light into the telescope.

Figure 13:
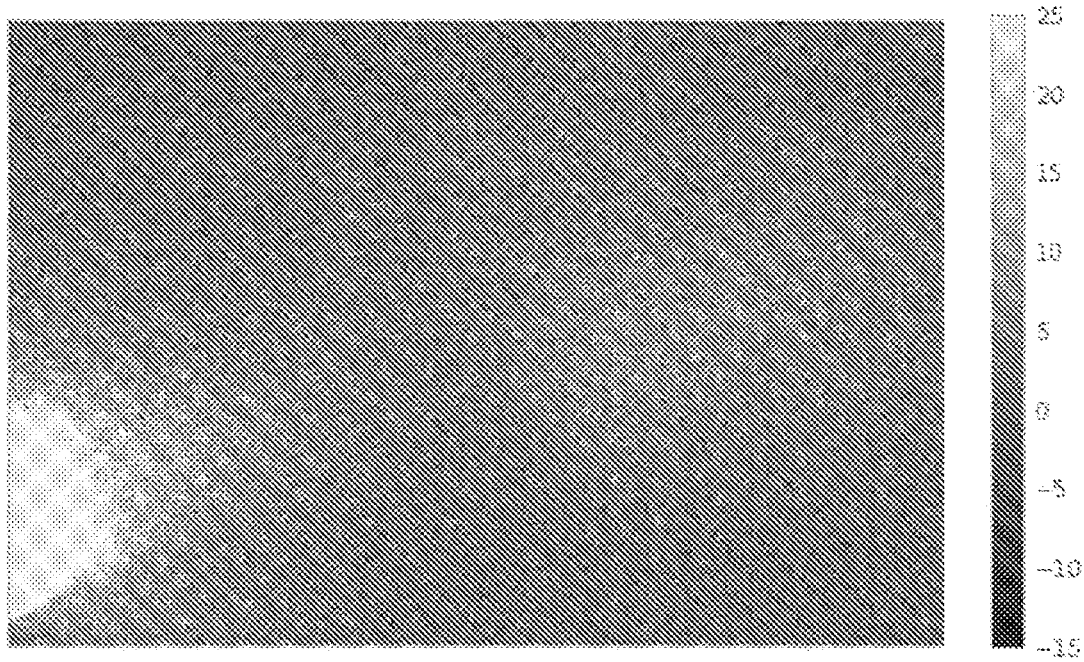
FIG. 13 is a photograph of the moon and nearby sky taken from the Newtonian telescope of FIG. 9.

FIG. 13 is a photograph of the moon and nearby sky taken from the Newtonian telescope of FIG. 9.

Figure 14:
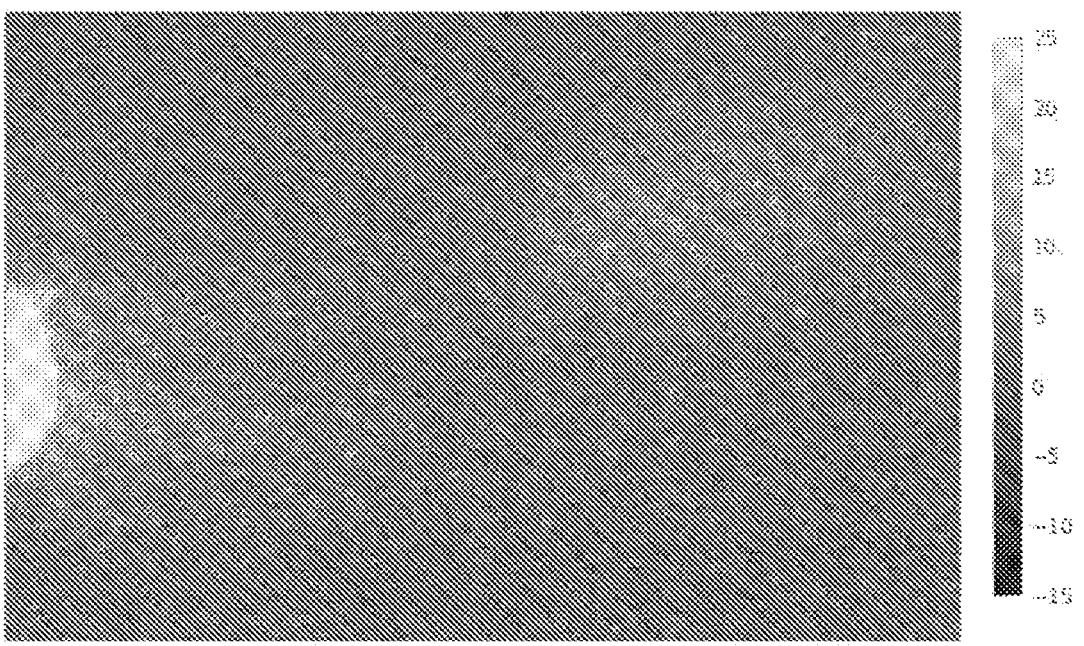
FIG. 14 is a photograph the moon and nearby sky taken from the Newtonian telescope of FIG. 12 with the prototype photon shield installed.

FIG. 14 is a photograph the moon and nearby sky taken from the Newtonian telescope of FIG. 12 with a prototype photon shield installed.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A telescopic apparatus for viewing orbiting or flying objects in daylight, comprising:
   a telescope tube having a length;
   an imager having a field of view (FOV), and being for receiving a light beam from a portion of sky defined by the field of view (FOV);
   a light protection structure for reducing impingement upon the imager of spectral energy outside of the FOV, the light protection structure comprising one or more light baffle rings attached internally along the length of the telescope tube and one or more structures selected from the group consisting of light shield(s), and fixed/variable apertures that are operative to reduce impingement upon the imager;
   a filter for reducing impingement upon the imager of spectral energy of wavelengths below a threshold wavelength, wherein the threshold wavelength comprises a wavelength at which total spectral radiance noise in an image is less than a spectral radiance of an object of interest in the image; and
   a control module for orienting the imager such that at an expected time the FOV includes spectral energy including Earthshine reflected from the object of interest, and enables the imager to capture imaging data associated with the object of interest, whereby
   the captured imaging data confirms an expected orbit or flight trajectory of the object of interest.

2. The telescope apparatus of claim 1 further comprising a photon shield.

3. A telescopic apparatus for viewing objects in space comprising:
- an imager having a field of view (FOV), and being for receiving light from a dim object within the field of view (FOV) near a bright light source brighter than the dim object;
- a light protection structure for reducing impingement upon the imager of spectral energy inside and outside of the FOV and scattering of light from the bright light source in the telescopic apparatus, the light protection structure comprising one or more structures selected from the group consisting of light shield(s), light baffle (s) and fixed/variable apertures that are operative to reduce impingement upon the imager;
- a telescope tube having a length; and
- a photon shield mounted to the telescope tube for reducing scattering of bright light near the dim object.

4. The telescopic apparatus of claim 3 wherein the light protection structure comprises one or more light baffle rings attached internally along the length of the telescope tube.

5. The telescopic apparatus of claim 4, wherein the imager comprises a Silicon (Si) photodetector.

6. The telescopic apparatus of claim 4, wherein the imager is selected from the group consisting of an Indium Arsenide (InAs) photodetector and a gallium arsenide (GaAs) photodetector.

7. The telescopic apparatus of claim 4, wherein the imager is selected from the group consisting of an indium gallium arsenide (InGaAs) photodetector, a Germanium (Ge) photodetector, a Lead sulfide (PbS) photodetector, an Indium antimonide (InSb) photodetector, a Mercury Cadmium telluride (MCT) photodetector, a lead selenide (PbSe) photodetector, and a Photovoltaic Mercury Cadmium Telluride (PV MCT) photodetector.

8. The telescopic apparatus of claim 4, further comprising a telescope shade mounted to an end of the telescope tube such that it prevents light from outside FOV from entering the telescope tube.

9. The telescopic apparatus of claim 8, wherein the telescope shade is cylindrical.

10. The telescopic apparatus of claim 8, wherein the telescope shade is frustoconical.

11. The telescopic apparatus of claim 8, further comprising a control module for orienting the telescopic apparatus such that at an expected time the FOV includes spectral energy including from a bright object near an object of interest.

12. The telescopic apparatus of claim 11, wherein the control module is further configured to minimize the amount of spectral energy coming from the bright object and maximize the amount of spectral energy coming from the object of interest.

13. The telescopic apparatus of claim 11, wherein the control module is further configured to adapt aim parameters of the telescopic apparatus in response to a position associated with the object of interest and generated using radar or lidar.

14. The telescopic apparatus of claim 13, wherein the control module is further configured to adapt the aim parameters in response to one or more of an orbit, flight path, trajectory, and ballistic characteristics of the object of interest.

15. The telescopic apparatus of claim 14, wherein the control module is further configured to adapt the aim parameters in response to an anticipated movement of the object of interest.

16. The telescopic apparatus of claim 11, wherein the FOV of the imager is defined by the light protection structures, the photon shield, optical receiving and redirecting components of an optical system; and the control module is further configured to adapt one or more of the optical receiving and redirecting components to adapt thereby the FOV.

17. The telescopic apparatus of claim 11, wherein the FOV of the imager is defined by the light protection structures, the photon shield, optical receiving and redirecting components of an optical system; and the control module is further configured to provide tip/tilt correction of the optical system components in response to received imagery associated with the object of interest.

18. The telescopic apparatus of claim 17, wherein the control module is further configured to provide higher order correction of the optical system components in response to received imagery associated with the object of interest.

19. The telescopic apparatus of claim 18, wherein the control module provides higher order correction using at least one of a space object or other object of interest as a guide star.

* * * * *